United States Patent [19]
Amendolia

[11] 3,811,316
[45] May 21, 1974

[54] TESTING DEVICE FOR SHOCK ABSORBERS AND THE LIKE

[75] Inventor: Pasquale J. Amendolia, St. James, N.Y.

[73] Assignee: Motor Devices Corporation, Brooklyn, N.Y.

[22] Filed: Oct. 20, 1972

[21] Appl. No.: 299,581

[52] U.S. Cl. .......................................... 73/11, 73/92
[51] Int. Cl. ............................................ G01m 17/04
[58] Field of Search ....... 73/11, 161, 91, 92, 141 R, 73/143, 144

[56] References Cited
UNITED STATES PATENTS

| | | | |
|---|---|---|---|
| 1,795,623 | 3/1931 | Thompson et al. | 73/144 |
| 1,872,087 | 8/1932 | Martin | 73/144 |
| 2,248,653 | 7/1941 | Allendorff | 73/71.4 |
| 2,758,472 | 8/1956 | Bowen, Jr. | 73/144 |
| 2,723,553 | 11/1955 | Onions | 73/11 |

FOREIGN PATENTS OR APPLICATIONS 664,643 1/1952 Great Britain .......................... 73/11

Primary Examiner—Charles A. Ruehl
Attorney, Agent, or Firm—Bauer & Amer

[57] ABSTRACT

The invention provides a device for testing shock absorbers and the like to indicate the load that is actually being transmitted through the same in the compression and rebound modes by applying a cycling force to the test article, measuring its resistance to movement, and displaying the same through a visual indicator.

6 Claims, 1 Drawing Figure

PATENTED MAY 21 1974
3,811,316
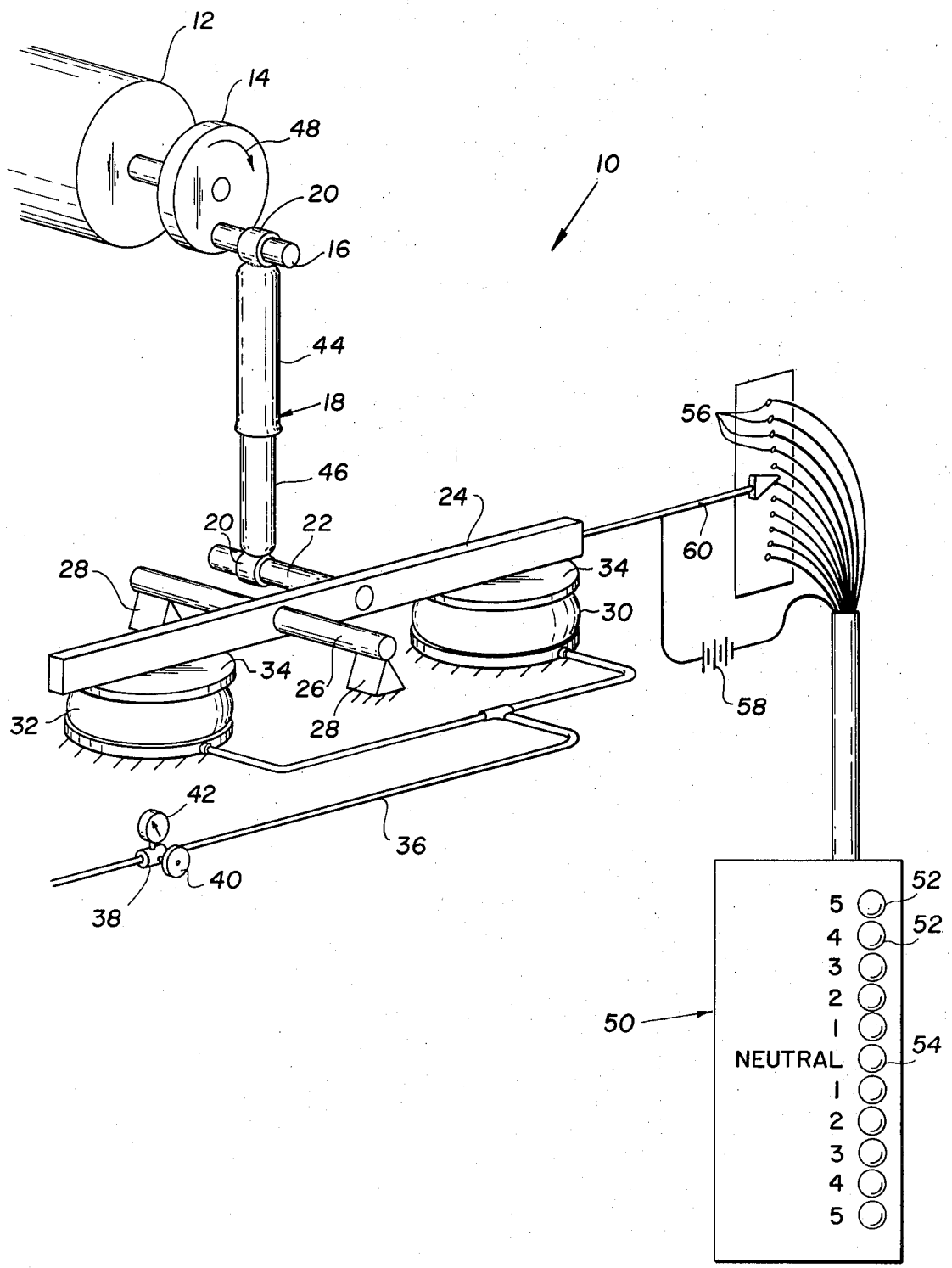

TESTING DEVICE FOR SHOCK ABSORBERS AND THE LIKE

BACKGROUND OF THE INVENTION

Shock absorbers are generally designed to produce a predetermined resistance to compression forces and oftentimes a different resistance to rebound or tensile forces. Often inaccuracies in the manufacture or even in the wear of the parts cause the shock absorbers to react differently, even those produced on the same manufacturing assembly line. Hence, it is desirable to check or test the reaction of shock absorbers and like articles to determine the extent of their compression and rebound resistances to determine whether the same are made in accordance with standards that are set up for such articles and to enable the adjustment of the shock absorbers whenever possible such that they will meet the standards for which they were manufactured.

Similarly, it is known that shock absorbers are constructed to receive certain compressive and certain rebound forces that differ from each other depending upon the end use to which they are put. Thus, for example, shock absorbers utilized in buses, trucks and the like are intended to react differently than those that are used in smaller vehicles or machines. Therefore, it is important that a device be provided to test such shock absorbers to assure their uniformity.

In the past, shock absorbers have been tested by utilizing swinging weights to operate the shock absorber as in the patent to Tea No. 2,716,883 or by the operation of a piston in a cylinder as in United States Letters Patent No. 2,660,879 to Allen. In United States Letters Patent No. 2,761,308 to Euker, the deflection of a torsion bar is utilized, while in the patent to Wilkinson No. 2,723,553, spring means is interposed in the structure for testing the shock absorber.

SUMMARY OF THE INVENTION

The desideratum of this invention is to test shock absorbers and the like to indicate the compressive and rebound forces that are actually transmitted through the article being tested.

Accordingly, an object of the invention is to provide a simple, yet inexpensive, testing device that is capable of transmitting compressive and tensile or rebound forces to the article to be tested and to enable the measurement of such forces as well as to display the same for visual viewing.

Another object of the invention is to utilize fluids to receive and absorb the compressive and rebound forces directly from the article tested and to transmit the same undiminished to structure for measuring and displaying the same.

Still another object and feature of the invention resides in the unique use of fluids to provide a device that is adjustable for use with shock absorbers and the like of different characteristics, thereby enabling the testing device to test shock absorbers and like articles over a whole range of compressive and rebound forces.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawing, wherein:

The FIGURE is a perspective view of a testing device for shock absorbers and the like constructed according to the teaching of the invention.

Referring now to the drawing, the testing device there shown is generally identified by the numeral 10. The device comprises a force applying means which includes a rotary power source such as a motor 12 for delivering or applying a rotation to a bell crank member 14 having an eccentrically mounted connecting means in the form of a pin 16.

Although the connecting means 16 is shown in its simplest possible form, it will be apparent that other more sophisticated connecting means may be utilized if necessary and to suit the need. Those skilled in the art will clearly understand, as the description proceeds, that the present invention may be utilized to test many articles and although the disclosure is here limited with respect to a shock absorber generally identified by the numeral 18, other articles may be tested by the present device 10 without departing from the spirit of the invention.

Inasmuch as shock absorbers 18 are usually provided with a simple loop connection at their upper and lower ends, here identified by the numeral 20, the use of the simple connecting means in the form of a pin 16 should be apparent and will suffice to serve as a teaching that any other convenient connecting means may be utilized. In the drawing, the shock absorber 18 is illustrated with its upper end mounted to the connecting means 16. Its lower relatively movable end having a similar loop connection 20 is mounted or connected with a similar simple connecting means 22, again shown in the form of a pin.

Included as part of the force receiving means, the connecting means 22 is mounted on and joined with to operate an elongated balance beam member 24 intermediate the ends thereof. The balance beam member 24 joined with the connecting means 22 is pivoted intermediate its ends by the provision of a pivot element or shaft 26. For convenience of understanding, the shaft 26 is shown supported on a stationary base 28.

It will be noted that the axis of the pivot 26 of the beam member 24 is relatively spaced from the joint or connection of such beam with the connecting means 22. Both the joint made with the connecting means 22 and the pivot 26 are spaced inward from the end portions of the beam 24 which are engageable with and supported by relatively spaced yieldable fluid springs 30 and 32. The fluid springs may be constructed of a resilient material to enable them to flex and yield under pressure. Each of them includes a relatively flat upper surface 34 on which the beam 24 is supported. Each fluid spring is preferably mounted on a level stationary surface and immovably secured in place with respect to the pivot 26 of the beam 24.

Although the present invention discloses the application of fluids to the fluid springs 30 and 32, it will be clear that the use of air, being a gaseous fluid, is most conveniently usable in the present disclosure. A fluid supply (not shown), as a convenient source of compressed air, is connected with each of the fluid springs 30 and 32 by a closed conduit 36 so as to direct equally the fluid from the source to each of the fluid springs. For the purposes of description of the present invention and its teaching, it is sufficient to note that fluid from the fluid source or supply may be directed and finitely regulated to supply a desired fluid pressure to each of the fluid springs 30 and 32.

Interposed within the conduit 36 is an operable pressure regulator valve 38 that may be manipulated by a knob 40 to control the fluid pressure that will be applied to each of the fluid springs from the fluid supply. Also interposed in the fluid conduit is a fluid pressure gauge 42 which enables the operator to visually preceive and quickly see the fluid pressure contained in each of the springs 30 and 32.

In operation, the motor 12 is initiated and caused to rotate to produce a corresponding rotation in the bell crank 14 and a consequent cyclical up and down or reciprocating movement of the upper part 44 of the shock absorber 18 relative to the lower part 46. Inasmuch as the upper and lower relatively movable parts of the test article 18 are secured to the force applying means and to the force receiving means, the compressive and rebound test forces applied to the shock absorber will be transmitted directly to the beam 24.

Each time the bell crank 14 and its connecting means 16 rotates to its lowermost point wherein the parts 44 and 46 of the shock absorber are relatively closed, the shock absorber is subjected to the greatest compressive force. During such compressive force application, the beam 24 is caused to pivot downward at its forward end, namely, to the right of its pivot 26. The compressive force applied through the beam to the shock absorber is thus imparted to the fluid spring means 30. The application of the compressive force to the fluid spring means 30 produces a consequent movement or application of force on the fluid or compressed air in the spring undiminished along the conduit 36 to the pressure gauge 42. Any force applied to the fluid in the spring 30 is thus reflected in a consequent movement of the indicator needle of the gauge 42. Hence, by watching the regulator gauge, the operator of the test device 10 may readily see and evaluate the full extent of the compressive forces being transmitted through and absorbed by the shock absorber 18.

In like manner, as the bell crank 14 continues to rotate clockwise in the direction of the arrow 48 and the connecting means or pin 16 reaches its topmost position of movement, the parts 44 and 46 of the shock absorber are extended and separated from each other. In this condition of operation, the shock absorber is subjected to its greatest rebound force. During this movement, a corresponding lifting force is applied to the connecting means 22 joined with the beam 24 causing the beam to pivot about its shaft 26 to lower the rear or leftmost end of the beam 24 against the surface 34 of the fluid spring 32. This rebound movement of the beam against the fluid spring 32 produces a consequent application of pressure against the fluid trapped within the spring 32 and thereby produces a fluctuation of the needle of the pressure regulator gauge 42 to permit the operator to see precisely the extent of the rebound forces applied through and absorbed by the shock absorber 18.

It should be clear that the pressure in each of the fluid springs 30 and 32 may be minutely and infinitely regulated by the control of the pressure regulator valve 38 at the knob 40. Thus, the present test device 10 may be made to operate with shock absorbers and like test articles of varying characteristics simply by varying the air pressure in the air springs. A more finite and infinite control of the air springs may be accomplished by dividing the duct or conduit 36 so as to provide separate fluid pressure conduits from the source to each of the air springs by way of separate regulating valves 38 and manipulating knobs 40. These will enable the operator to read the respective movements and pressures in each such fluid springs by further mounting two pressure gauges 42 on the respective conduits, one for each fluid spring.

In practice, it has been found that a more rapid reading and better understanding of the characteristics of the test article 18 may be had by the utilization of an electrically controlled panel generally identified by the numeral 50. Such panel may include a plurality of illuminable elements which may take the form of small lights 52. These elements 52 may be spaced on different sides of a neutral illuminating means 54. The panel and its accompanying electrical connections 56 may form a part of an electrical circuit which will include a source of electrical current 58 connected with an electrical contact means in the form of an arm 60. The electrical contact arm 60 may be mounted at any convenient location on the beam 24 for conjoint movement therewith.

When the force receiving means or beam 24 is in its neutral position, the electrical contact arm will initiate the illumination of the neutral light 54 by engagement with its contact 56 as is illustrated in the drawing. When the beam or force receiving means 24 is caused to cyclically follow its compressive and rebound movements in response to the application and receipt of such forces by the afore-described structure, the electrical contact arm 60 will perform alternating engaging movements with certain ones of the contacts 56 thereby producing a consequent illumination of their respective lights 52.

It should be apparent that the use of the electrical circuit, which includes the electrical panel 50 and its illuminable means 52 and 54, will provide a secondary and more demonstrative visual representation of the forces absorbed by the test article 18 during the compressive and rebound movements of the parts of such article. In the initial set-up of the present device 10, it will be necessary merely to calibrate the lights 52 on opposite sides of the neutral position 54 such that they will correspond to certain compressive and rebound force values that are absorbed by the test article 18. The fluid regulator gauge 42 may be similarly predeterminately calibrated. Because of the ability to vary the calibrations of the regulator gauge 42 and the illuminating means of the panel 50 and because of the ability to regulate the fluid pressure in the fluid springs 30 and 32, the present device has a wide range of application with many types of test articles of different characteristics.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a device for testing articles as shock absorbers and the like having relatively movable parts, means connected with the relatively movable parts of the test article to support the test article therebetween, means to apply compressive and rebound test forces to said connecting means at one of the parts of the test article, a member joined with said connecting means at another relatively movable part of the test article, said member being pivoted for movement intermediate its ends and spaced from the jointure of said member with said connecting means, relatively spaced yieldable fluid means supporting said member on opposite sides of its pivot, a fluid supply connected with said yieldable fluid means to supply fluid thereto with said yieldable fluid means on one side of said pivot receiving the compressive forces and said yieldable fluid means on the other side of said pivot receiving the rebound forces, and gauge means on said fluid supply to indicate the fluid pressure in said yieldable fluid means and the compressive and rebound forces received by said yieldable fluid means, said member being a beam extending between and freely supported on and for pivoted movement between said yieldable fluid means to selectively apply the compressive and rebound test forces to selected ones of said yieldable fluid means on opposite sides of its pivot.

2. In a device as in claim 1, said force applying means being rotary powered to apply a cyclical force to said connecting means.

3. In a device as in claim 2, said fluid supply being air and said yieldable fluid means being air containing bellows.

4. In a device as in claim 1, and means connected with said fluid supply to variably regulate the fluid pressure of said yieldable fluid means.

5. In a device as in claim 1, an electrical circuit including a source of electricity, an illuminable indicator panel to indicate the compressive and rebound forces applied through the test article to said member, an electrical contact means on said member and said indicator panel and said electrical contact means being movable with said member and engageable with said panel electrical contact means to illuminate said indicator panel.

6. A device for testing articles as shock absorbers and the like comprising compressive and rebound test force applying and receiving means, said force receiving means being movable about a pivot, fluid springs supporting said force receiving means for compressive and rebound movement about its pivot, said force receiving means extending between said fluid springs for movement about its pivot to selectively apply the compressive and rebound test forces to selected ones of said fluid springs, a source of fluid for supplying fluid to said springs, means between said source and springs to variably regulate the fluid pressure of said springs and including means to indicate variations of fluid pressure in said springs in response to the application of compressive and rebound forces applied thereto, means connecting the test article between said force applying and said force receiving means to enable the test forces applied to the test article to be transmitted to and for receipt by said force receiving means, said pivot being intermediate the ends of said force receiving means, said fluid springs being spaced from each other on opposite sides of said pivot, and said means connecting the test article to said force receiving means being between said spaced fluid springs, an electrical circuit including a source of electricity, an indicator panel having a plurality of illuminable means to indicate the compressive and rebound forces applied through the test article, electrical contact means associated with each of said illuminable means, and a movable contact on and responsive to the movement of said force receiving means to engage with selected ones of said electrical contact means to complete an electrical circuit with and cause the illumination of selected ones of said illuminable means.

* * * * *